United States Patent [19]

Holenka

[11] Patent Number: 4,661,700
[45] Date of Patent: Apr. 28, 1987

[54] WELL LOGGING SONDE WITH SHIELDED COLLIMATED WINDOW

[75] Inventor: Jacques M. Holenka, Houston, Tex.

[73] Assignee: Schlumberger Technology Corporation, Houston, Tex.

[21] Appl. No.: 737,756

[22] Filed: May 28, 1985

[51] Int. Cl.$^4$ .............................................. G01V 5/12
[52] U.S. Cl. .................................. 250/267; 250/256; 250/266; 250/269
[58] Field of Search ............... 250/267, 269, 268, 266, 250/265, 264, 262, 261, 256

[56] References Cited

U.S. PATENT DOCUMENTS

| | | | |
|---|---|---|---|
| 2,778,951 | 1/1957 | Tittman | 250/268 |
| 2,934,652 | 4/1960 | Caldwell | 250/267 |
| 3,247,384 | 4/1966 | Brady | 250/496.1 |
| 3,263,082 | 7/1966 | Caldwell | 250/267 |
| 3,321,625 | 5/1967 | Wahl | 250/268 |
| 3,864,569 | 2/1975 | Tittman | 250/264 |
| 4,004,151 | 1/1977 | Novak | 250/485.1 |
| 4,034,218 | 7/1977 | Turcotte | 250/269 |
| 4,048,495 | 9/1977 | Ellis | 250/264 |
| 4,492,865 | 1/1985 | Murphy et al. | 250/256 |
| 4,504,736 | 3/1985 | Smith, Jr. | 250/256 |

FOREIGN PATENT DOCUMENTS

96975 12/1983 European Pat. Off. .

OTHER PUBLICATIONS

W. E. Schultz, A. Nunley, J. G. Kampfer and H. D. Smith, Jr., "Dual Detector Lithology Measurements With a New Spectral Density Log", SPWLA 26th Annual Logging Symposium (Jun. 1985).

H. D. Smith, Jr., C. A. Robbins, D. M. Arnold, L. L. Gadeken and J. G. Deaton, "A Multi-Function Compensated Spectral Natural Gamma Ray Logging System", SPE 58th Annual Technical Conference, SPE paper 12050 (Oct. 1983).

Primary Examiner—Janice A. Howell
Assistant Examiner—Constantine Hannaher
Attorney, Agent, or Firm—Henry N. Garrana; Mary M. Yawney

[57] ABSTRACT

A well logging sonde is disclosed which includes a collimating window design for the accurate detection of gamma rays of low and high energy which are backscattered from a region near a source of gamma rays emitted into the formation. The sonde includes a tungsten support inner tube or shell surrounded by a length of "U" shaped steel. A conduit is formed in the wall of the shell at an angle with respect to its axis and is oriented symmetrically toward the opening of the "U" shaped steel support member. A closing member of a thin layer of titanium is welded to the open ends of the "U" shaped steel member. An arcuate tungsten pad is secured about the titanium closing member and partially about the exterior of the open ends of the "U" shaped steel support member. A conduit in the pad is aligned with the conduit of the inner shell to form a collimating window. A gamma ray detector of a length shorter than the "U" shaped steel section is mounted within the inner tube in the path of the collimating window.

22 Claims, 3 Drawing Figures

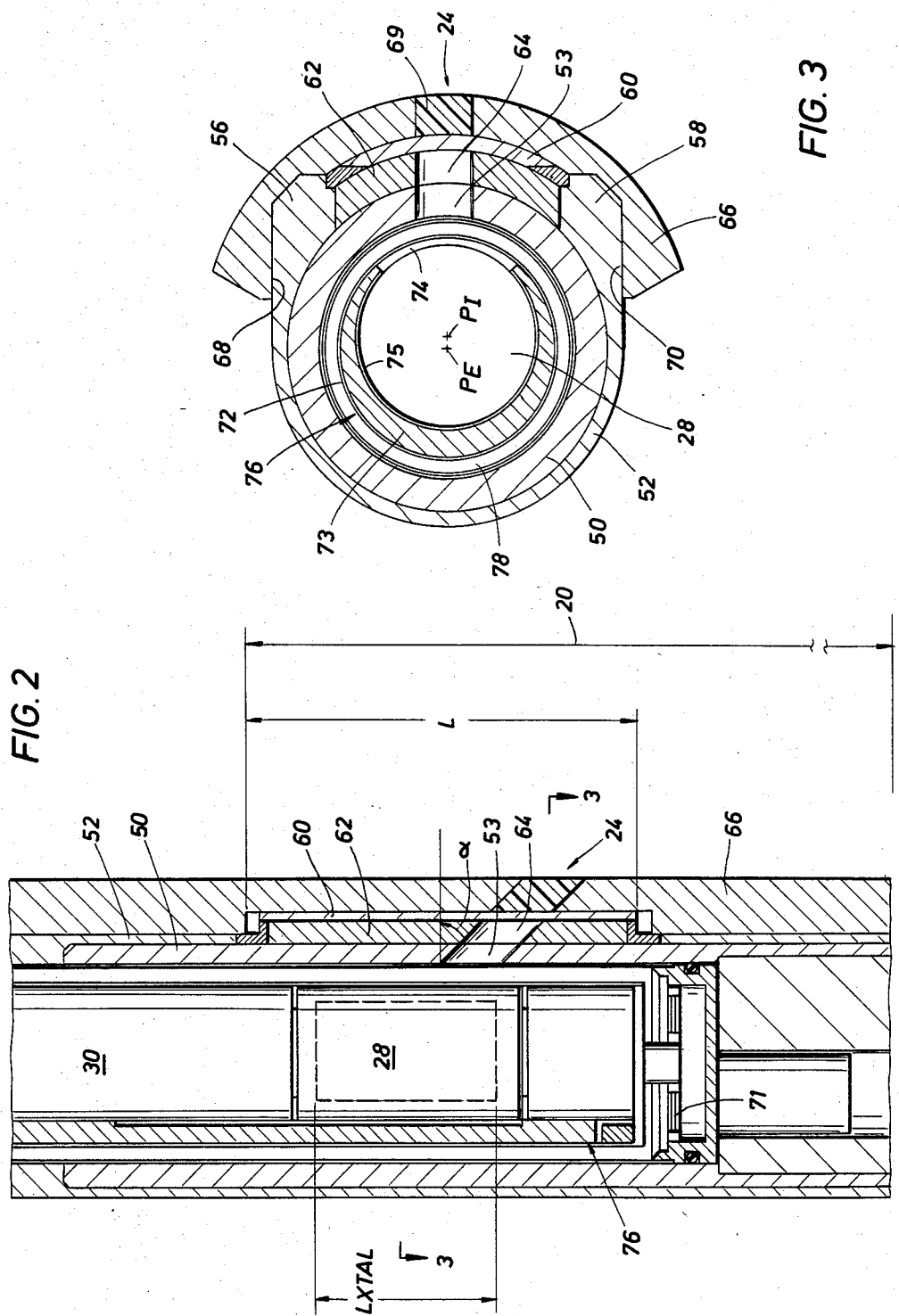

WELL LOGGING SONDE WITH SHIELDED COLLIMATED WINDOW

BACKGROUND OF THE INVENTION

1. Field of the Invention

This invention relates to well logging apparatus, and more particularly to a well logging sonde having a shielded collimating window for detecting back-scattered gamma rays from a formation about a borehole.

2. Description of the Prior Art

Nuclear logging tools for transport through a borehole are known which detect photons or gamma rays that have been emitted from a source in the tool and scattered from the formation. If the detected gamma rays have energies from about one hundred thousand electron volts (100 keV) to one million electron volts (1 MeV), the measurement may indicate the electron density and consequently the porosity of the formation.

The attenuation mechanism for gamma rays with energies less than about 100 keV, however, provides an indication of the chemical composition of the formation. Chemical or mineral composition information of the formation is available because these low energy photons are absorbed through the photoelectric effect.

U.S. Pat. No. 3,864,569 to J. Tittman discloses well logging apparatus for identifying the chemical composition of an earth formation and which compensates for mudcake during well logging. Tittman suggests that the formation be irradiated with photons that have energies less than 1 MeV. Tittman recommends that a low energy gamma radiation detector be positioned close to the gamma radiation source primarily to measure borehole parameters, and recommends that a second low energy gamma ray detector be spaced more distantly from the gamma ray source to measure borehole characteristics and the mineral composition of the formation. Signals from the detectors recommended by Tittman's patent are normalized and combined to provide an output that identifies formation lithology and effective mudcake thickness.

The Tittman patent teaches no means for collimating back-scattered gamma rays in the formation in proximity to the near spaced detector. As a result, the gamma rays which are detected by the near spaced detector may come from a wide spatial distribution in the formation. For that reason Tittman's suggested apparatus measures photoelectric effect reactions not only close to the borehole, but may also represent gamma rays which have been Compton scattered from a region deeper into the formation.

U.S. Pat. No. 4,048,495 to Ellis discloses a density logging apparatus in which the near spaced detector does have a collimating window. The collimating window of the Ellis patent provides a shield opaque to gamma rays and preferably formed of tungsten which is provided on the external face of a pad which is pressed against the borehole wall. The near spaced detector of the Ellis patent however, has associated electronics in order to eliminate the influence of the average atomic number of the elements in which the detection diffuses. The electronic count rate of the back-scattered gamma rays detected by the detector is measured in a restricted energy range chosen such that back-scattered gamma rays resulting from Compton scattering is the only consequential form of interaction with the adjacent materials.

IDENTIFICATION OF OBJECTS OF THE INVENTION

It is a primary object of this invention to provide a well logging sonde with a short spacing detector which has an improved collimating window and means for shielding the detector from extraneous back-scattered gamma rays either from the gamma ray source or from a region in the formation not spatially aligned with the collimating window.

It is another object of the invention to provide a borehole sonde having a collimated window substantially transparent to the passage of gamma rays which may withstand very high borehole pressures.

It is another object of the invention to provide a borehole sonde having a near detector disposed in the path of a collimated window to measure the density and the photoelectric effect of a region of limited lateral range including the borehole mudcake.

SUMMARY OF THE INVENTION

The objects identified above as well as other advantages and features of the invention are incorporated in a well logging sonde adapted for measuring properties of a geological formation surrounding the borehole. The sonde includes a first section including a source for emitting gamma rays into the formation. A second section is connected to the first section and includes an inner cylindrical shell fabricated of a gamma ray opaque material and having a collimating window or conduit formed in its wall at an angle $\alpha$ with respect to a plane perpendicular to its axis. A gamma ray detector is disposed in the path of the collimating window within the inner cylindrical shell. The angle $\alpha$ of the collimated window and the source-to-detector spacing are selected so that the high energy photons reaching the detector are primarily photons which have undergone a single Compton scattering at a lateral distance from the borehole wall beyond the mudcake.

An outer substantially "U" shaped metallic outer shell partially envelops the inner shell and has an axial length L. The open sides of the "U" shaped outer shell extend outwardly and symmetrically with respect to the inner shell conduit. An outer closing member, fabricated of a strong, substantially gamma ray transparent material is sealingly secured to the open ends of the "U" shaped outer shell.

An arcuate pad fabricated of a gamma ray opaque material is disposed about the closing member and extends about the open ends of the "U" shaped outer shell. The arcuate pad has a conduit formed at the same angle as the conduit in the inner shell. The arcuate pad conduit is aligned with the inner shell to form a collimating window interrupted by the closing member.

The first gamma ray detector described above is of a length less than the length L and is operably mounted within the inner cylindrical shell in the path of the collimating window and indicates back-scattered gamma rays from a region near the source of gamma rays in the geological formation which pass through the collimating window and the closing member.

Preferably, the gamma ray opaque material used in the sonde is tungsten and the gamma ray transparent material is titanium. The outer substantially "U" shaped shell is preferably fabricated of steel.

The sonde further comprises an arcuate intermediate member fabricated of tungsten and disposed between the inner cylindrical shell and the arcuate closing member. The intermediate member has a conduit formed through its wall at the same angle with respect to the axis of the sonde as the inner shell conduit and the arcuate pad conduit. The conduits of the inner cylindrical shell, the arcuate intermediate member and the arcuate pad are aligned to form a collimating window interrupted by the closing member.

The closing member provides a means for sealing the collimating window against the high pressure of the borehole in which the sonde is likely to encounter, yet allows relatively low energy gamma rays to pass uninterrupted through the collimating window to the detector. The arcuate pad conduit is filled with a gamma ray transparent material such as epoxy resin to isolate drilling fluid and cuttings from the closing member.

According to the invention, the gamma ray indicating means is preferably a sodium iodide crystal and the source means for emitting gamma rays is a pellet of cesium 137.

The sonde further includes a third section connected with the first and second sections such that the second section is nearer the first section than the third section. A second gamma ray indicating means such as a sodium iodide crystal is operably mounted within the third section for indicating back-scattered gamma rays from a second region of the geological formation.

The sodium iodide crystal is mounted within the cylindrical shell of the sonde so that the crystal is thermally isolated from the cylindrical shell. The cylindrical iodide crystal is disposed within a shielding member having a generally cylindrically shaped exterior with a first side wall of the shielding member being substantially gamma ray transparent and a second side wall of the shielding member being formed of a gamma ray opaque material.

The first side wall of the shielding member faces the collimating window. The second side wall of the shielding member is preferably formed of tungsten. The shielding member has a generally cylindrically shaped interior mounting cavity for placement of the iodide crystal therein. The axis of the interior cylindrical cavity is displaced from the axis of the exterior cylindrical shape toward the collimating window on a plane passing through the center of the collimating window and the axis of the exterior cylindrical shape.

BRIEF DESCRIPTION OF THE DRAWINGS

The objects, advantages and features of the invention will become more apparent by reference to the drawings which are appended hereto and wherein like numerals indicate like parts and wherein an illustrative embodiment of the invention is shown, of which:

FIG. 2 is a partial axial cross-section of the sonde showing a gamma ray detector disposed in the path of a shielded collimating window; and FIG. 3 is a cross-section taken along lines 3—3 of FIG. 2 and illustrates the construction of the sonde with its shielding components disposed relative to the collimating window.

DESCRIPTION OF THE INVENTION

Figure 1:
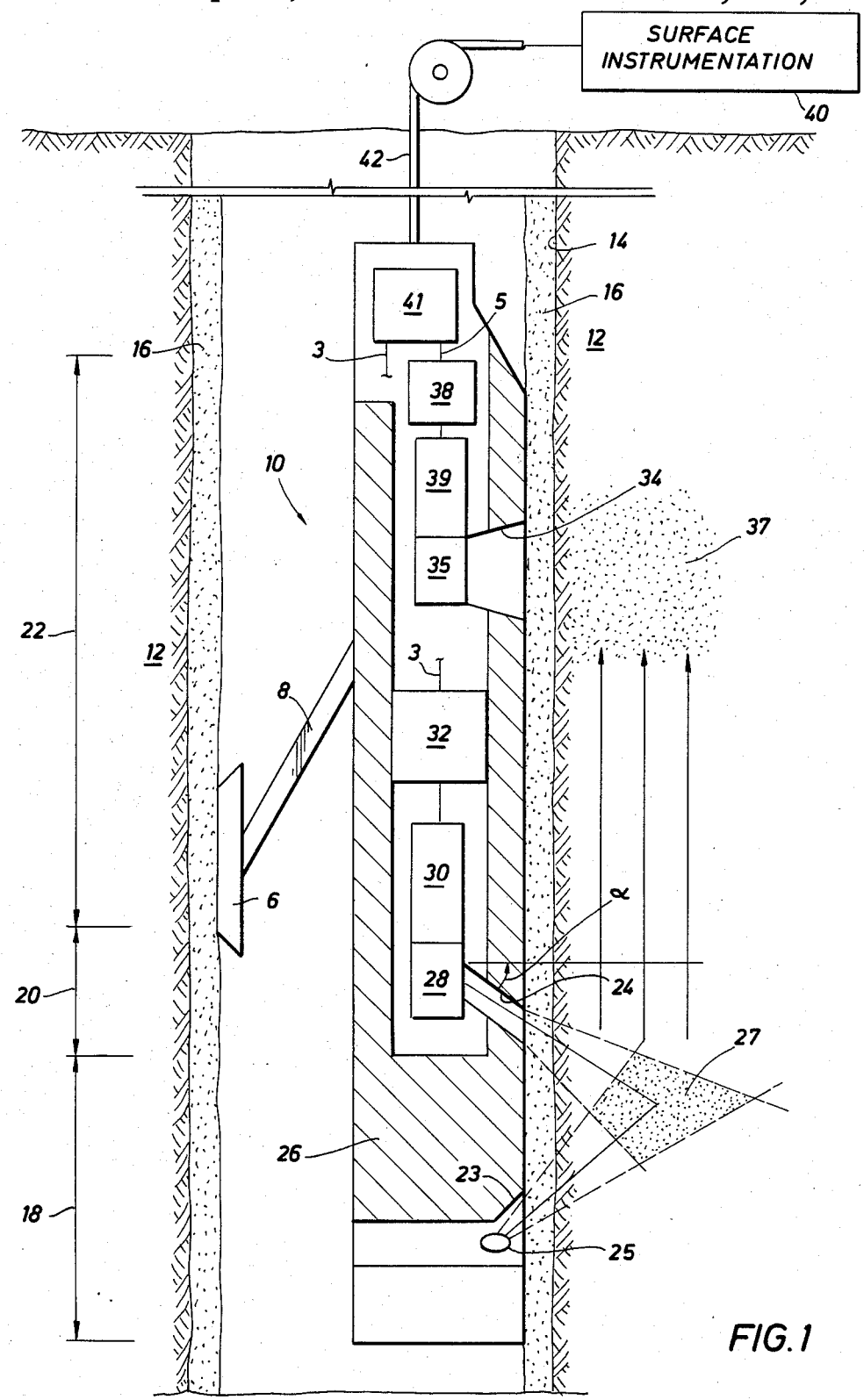
FIG. 1 is a schematic representation of a logging sonde, according to the invention, in which a section of the sonde includes a gamma ray detector with a shielded collimating window for detecting gamma rays from a geographically certain region of the adjacent borehole.

FIG. 1 illustrates the sonde 10 according to the invention disposed in a borehole 14 through a formation 12. A mudcake 16 is shown schematically as being formed about the interior of the borehole. FIG. 1 illustrates schematically that the sonde is urged against the borehole and mudcake wall by means of a linkage 8 and eccentering skid 6 so as to measure as accurately as possible the energies of back-scattered gamma rays from the formation by gamma ray detectors.

The sonde may be divided for case of illustration generally into a first interval 18, a second interval 20 and a third interval 22. The first interval of the sonde includes a source 25 of gamma rays for irradiating the formation. Preferably, the source is a pellet of cesium 137 for emitting gamma rays of an energy of 662 keV into the formation.

A second interval 20 includes a gamma ray detector, preferably a sodium iodide crystal gamma ray detector 28.

A photomultiplier tube 30 is coaxially disposed with detector 28 for generating electrical signals responsive to light flashes of the detector 28 in response to gamma ray impact. Electronics section 32 processes the signals from photomultiplier 30. It will be discussed more specifically below.

A shielded collimated window 24 is provided facing at an angle $\alpha$ with respect to a plane perpendicular to the axis of the sonde and toward gamma ray source 25 so as to cause the detector 28 to be primarily in the path of photons back-scattered from a region 27 beyond the mudcake 16. The angle $\alpha$ at which the window 24 faces the source 25, and the source 25—detector 28 spacing are selected so that the high energy gamma rays or photons which impinge on the detector 28 primarily result from a single Compton scattering event taking place in the region 27 of the formation. The sonde 26 may be provided with partial collimation by providing an angled cut-out region 23, for example, to direct gamma rays from source 25 toward formation region 27.

A third interval of the sonde includes a second detector 35 which is responsive to a second region 37 in the formation 12 where gamma rays are scattered back to the detector 35 via a window 34. A second photomultiplier tube 39 is responsive to the flashes of crystal 35 and electronics 38 are responsive to the photomultiplier tube 39.

The sonde transmission electronics 41 is responsive to the first detector electronics 32 via leads 3 and the second electronics 38 via leads 5 for transmitting the associated signals via cable 42 to surface instrumentation 40 where the signals may be processed.

The electronics 32 and electronics 38 for each of the near detector 28 and the far detector 35 may discriminate the pulses associated with detected gamma rays into various energy ranges or energy "windows".

In the high energy window, for example above 200 keV, only photons resulting primarily from single Compton scattering events in the region 27 are received because of the angle $\alpha$ of the near detector 28 and the spacing between detector 28 and the source 25. The high shielding about the detector insures that stray high energy gamma rays do not impinge upon detector 28. As a result, the single scattering high energy gamma rays in region 27 are the only high energy gamma rays which pass through collimating window 24 and impinge on detector 28. By providing collimating window 24 and high shielding of the detector 28, an accurate indication of density of the formation may be derived in surface instrumentation 40 from the counts (H) of gamma rays in the high energy electronic window of electronics 32 and transmitted via lead 3 and cable 42.

In the low energy window, for example below 100 keV, gamma rays which impinge on detector 28 result from photoelectric absorption and from multiple Compton scattering. The atomic number Z and, as a consequence, the photoelectric effect (PEF) of the formation is derived from the ratio of the counts (S) of the low energy electronic window and the counts (H) of the high energy electronic window. The counts (H) of the high energy window annuls the Compton effect of the count rate of the low energy window.

Turning now to FIG. 2, a partial axial cross-section of the section 2 of the sonde is illustrated. FIG. 3 is a cross-section through lines 3—3 of FIG. 2 and illustrates a radial cross-section of the sonde within section 2 of it as indicated by reference arrow 20. The sonde includes a cylindrical inner shell 50 preferably fabricated of tungsten and having a conduit 53 provided at an angle in its wall facing downwardly toward the source 24 in section 1 (as indicated by reference arrow 18) of the sonde. A "U" shaped member 52 substantially envelops the cylindrical inner shell 50 but has open ends 56 and 58 which extend outwardly and symmetrically about the conduit 53. An intermediate closing member 62 fabricated of tungsten is disposed between the open ends 56 and 58 of the "U" shaped member 52 and includes a conduit 64 which is aligned with conduit 53 in the outer shell 50.

A closing member 60 is provided about the exterior of the intermediate closing member 62 and is sealingly secured to the ends 56 and 58 of the "U" shaped member. The bonding between the titanium closing member 60 and the steel ends 56 and 58 may be made by processes such as explosive bonding or by diffusion bonding.

An arcuate pad 66 is provided about the exterior of the closing member 60 and is shaped to fit about the open ends 56 and 58 of "U" shaped member and to provide superior shielding of the closing member 60 of the detector 28. The pad 66 about the cylindrical inner shell 50 extends downwardly about the exterior 68 and 70 of the "U" shaped member 52. A conduit 69 is provided in the pad 66 in alignment with the conduits 53 and 64. Preferably, the conduit 69 is filled with an epoxy resin so as to prevent drilling mud and cuttings from entering the conduit. The aligned conduits 53, 64 and 69 define a collimating window 24 to present a substantially gamma ray transparent path from the formation region 27 (see FIG. 1) toward the detector 28.

As illustrated in FIG. 2, the "U" shaped outer shell 52 fabricated preferably of steel, is of a length L. The detector 28 is disposed as illustrated between the ends of the length L of "U" shaped member 52 so as to provide optimum shielding of the detector 28 from stray electrons which may be directed toward the crystal but not via the collimating window 24.

As illustrated in FIGS. 2 and 3, the detector 28 is disposed within a shielding member 76 which is thermally isolatingly mounted by means of mounting members 71 secured to the cylindrical inner shell 50. The shielding member 76 has a generally cylindrically shaped exterior 72 and has a first wall 74 which is gamma ray transparent and a second wall 73 which is opaque to gamma rays and is fabricated of material such as tungsten.

The interior of the shielding member 76 is generally cylindrical in shape and has an interior wall 75 which is in the shape of a cylindrical for housing a cylindrical gamma ray detector 28 such as a sodium iodide crystal detector. The interior wall 75 has a center axis $P_I$ which is located on a plane passing through the center axis of the collimating window 64 and through the center axis $P_E$ of the generally cylindrically shaped exterior 72.

In summary, there is provided a structure as illustrated in FIGS. 2 and 3 for providing a great amount of shielding with respect to the sodium iodide crystal 28 with the aim of assuring that the only gamma rays detected by the sodium iodide crystal are those that enter it via the collimating window 24. The closing member 60 is preferably fabricated of a strong gamma ray transparent material such as titanium so that the sonde may be pressure tight against high pressures likely to be encountered in deep borehole environments. The thermally isolating means 71 and the dead air space 78 between the cylindrical inner shell 50 and the shielding member 70 serves to protect the crystal and the photomultiplier tube 30 from extreme temperatures likely to be encountered in deep borehole conditions.

By providing a closing member 60 of a material transparent to photons (such as titanium) and by providing shielding about collimating window 24 and about the detector 28 of a gamma ray opaque material such as tungsten, the count of photons reaching the detector 28 is representative of Compton scattering events and photoelectric absorption events in the formation (including the mudcake) in the direction of the window 24 and not from stray paths through other parts of the sonde 26. The photon count rate (H) in the electronic high energy "window" of electronics 32 accurately indicates electron density of the formation, because high energy gamma rays reaching detector 28 result primarily from single Compton scattering events in region 27. The photon count rate (S) in the low energy electronic window of electronics 32 accurately indicates photoelectric absorption and the multiple Compton scattering events of the formation (including the mudcake, if any) near the sonde 26. As explained previously an accurate determination of the atomic number Z (and PEF) of the formation is obtained from the ratio of the counts (S) of the low energy window and the counts (H) of the high energy window.

What is claimed is:

1. A well logging sonde adapted for generating indications of the characteristics of the formation surrounding a borehole in which a borehole mudcake may have formed, the sonde comprising:
   a first section including source means for irradiating the formation with gamma rays;
   a second section including;
      a shielded housing having a collimated window facing the formation, the window being substantially transparent to gamma rays including low energy gamma rays of energies below 100 keV;
      a near detector disposed in said housing in the path of said collimated window, the window being disposed so that the high energy gamma rays reaching the detector have been singly scattered in a first region in the formation primarily beyond the borehole mudcake; and
      means responsive to said near detector for generating signals representative of the density of said first region and of the photoelectric absorption of said formation surrounding said borehole;

wherein said shielded housing having a collimated window comprises:

an inner cylindrical shell fabricated of a gamma ray opaque material and having a conduit formed in its wall at an angle with respect to its axis;

an outer substantially "U" shaped metallic outer shell partially enveloping said inner shell and having an axial length L, the open ends of said "U" shaped outer shell extending outwardly and symmetrically with respect to said inner shell conduit;

an arcuate closing member, fabricated of a strong, substantially gamma ray transparent material and sealingly secured to the open ends of said "U" shaped outer shell; and an arcuate pad fabricated of a gamma ray opaque material and disposed about said closing member and about said open ends of said "U" shaped outer shell, said arcuate pad having a conduit formed at the same angle as the conduit in said inner shell, said arcuate pad conduit being aligned with said inner shell to form a collimating window interrupted by said closing member.

2. The sonde of claim 1 wherein said collimated window faces said formation and toward said source means at an angle with respect to a radial plane through the sonde.

3. The sonde of claim 2 wherein said signal representative of density of said first region is generated from a photon count rate of an electronic high energy window.

4. The sonde of claim 3 wherein said signal representative of the photoelectric absorption of said formation surrounding said borehole is generated from a ratio of the photon count rates of an electronic low energy window and said electronic high energy window.

5. The sonde of claim 1 further comprising gamma ray transparent means for sealingly covering said collimated window from high pressure borehole conditions.

6. The sonde of claim 5 wherein said covering means is fabricated of titanium and is bonded to said housing about said collimated window.

7. The sonde of claim 1 wherein said gamma ray opaque material is tungsten.

8. A well logging sonde adapted for measuring properties of a geological formation surrounding a borehole comprising, a first section including source means for emitting gamma rays into the formation, a second section connected to said first second and including, an inner cylindrical shell fabricated of a gamma ray opaque material and having a conduit formed in its wall at an angle with respect to its axis, an outer substantially "U" shaped metallic outer shell partially enveloping said inner shell and having an axial length L, the open ends of said "U" shaped outer shell extending outwardly and symmetrically with respect to said inner shell conduit, an arcuate closing member, fabricated of a strong, substantially gamma ray transparent material and sealingly secured to the open ends of said "U" shaped outer shell, an arcuate pad fabricated of a gamma ray opaque material and disposed about said closing member and about said open ends of said "U" shaped outer shell, said arcuate pad having a conduit formed at the same angle as the conduit in said inner shell, said arcuate pad conduit being aligned with said inner shell to form a collimating window interrupted by said closing member, and first gamma ray indicating means of an axial length less than said length L and operably mounted within said inner cylindrical shell in the path of said collimating window for indicating back-scattered gamma rays from a first region of said geological formation which pass through said collimating window and said closing member.

9. The sonde of claim 8 wherein said gamma ray opaque material is tungsten.

10. The sonde of claim 8 wherein said gamma ray transparent material is titanium.

11. The sonde of claim 8, wherein said outer substantially "U" shaped shell is fabricated of steel.

12. The sonde of claim 8 wherein
said gamma ray opaque material is tungsten,
said gamma ray transparent material is titanium, and
said outer substantially "U" shaped shell is fabricated of steel.

13. The sonde of claim 8 further comprising an arcuate intermediate member fabricated of a gamma ray opaque material and disposed between said inner cylindrical shell and said arcuate closing member, said intermediate member having a conduit formed through its wall at the same angle as the inner shell conduit and said arcuate pad conduit, said conduits of said inner cylindrical shell, arcuate intermediate member and arcuate pad being aligned to form a collimating window interrupted by said closing member.

14. The sonde of claim 13 wherein said gamma ray opaque material of said intermediate member is tungsten.

15. The sonde of claim 8 wherein said arcuate pad conduit is filled with a gamma ray transparent epoxy resin.

16. The sonde of claim 8 further comprising,
a third section connected with said first and second sections, said second section being nearer said first section than said third section, and
second gamma ray indicating means operably mounted within said third section for indicating back-scattered gamma rays from a second region of said geological formation.

17. The sonde of claim 8 further comprising,
means for mounting said gamma ray indicating means within said cylindrical shell so that said crystal is thermally isolated from said cylindrical shell.

18. The sonde of claim 17 wherein said gamma ray indicating means is a sodium iodide crystal and is cylindrically shaped and is disposed within a shielding member, said shielding member having a generally cylindrically shaped exterior with a first side wall of said shielding member being substantially gamma ray transparent and a second side wall of said shielding member formed of a gamma ray opaque material, said first side wall of said shielding member facing said collimating window.

19. The sonde of claim 18 wherein said second side wall of said shielding member is formed of tungsten.

20. The sonde of claim 18 wherein said shielding member has a generally cylindrically shaped interior mounting cavity for placement of said iodide crystal therein, the axis of said interior cylindrical shape being on a plane passing through the center of said collimating window and the axis of said exterior cylindrical shape.

21. The sonde of claim 8 wherein, said arcuate pad partially extends about said open ends of said "U" shaped outer shell.

22. A well logging sonde adapted for measuring properties of a geological formation surrounding a borehole comprising,
   a first section including source means for emitting gamma rays into the formation,
   a second section connected to said first second and including,
   an inner cylindrical shell fabricated of a gamma ray opaque material and having a conduit formed in its wall at an angle with respect to its axis,
   an outer "U" shaped metallic outer shell partially surrounding said inner shell, the open ends of said "U" shaped outer shell extending radially outwardly about said inner shell conduit,
   a titanium closing member sealingly secured to the open ends of said "U" outer shell, and
   first gamma ray indicating means operably mounted within said inner cylindrical shell in the path of said inner shell conduit for indicating back-scattered gamma rays from a first region of said geological formation which pass through said titanium closing member and said inner shell conduit.

* * * * *